(12) United States Patent
Martin et al.

(10) Patent No.: US 11,500,977 B2
(45) Date of Patent: Nov. 15, 2022

(54) USER AUTHENTICATION IN A THREE-DIMENSIONAL (3D) ALTERNATIVE REALITY SOFTWARE APPLICATION

(71) Applicant: FMR LLC, Boston, MA (US)

(72) Inventors: David Martin, Natick, MA (US); Megh Jagad, Brookline, MA (US); Thomas McGuire, Claregalway (IE)

(73) Assignee: FMR LLC, Boston, MA (US)

( * ) Notice: Subject to any disclaimer, the term of this patent is extended or adjusted under 35 U.S.C. 154(b) by 367 days.

(21) Appl. No.: 16/736,317

(22) Filed: Jan. 7, 2020

(65) Prior Publication Data
US 2021/0209214 A1 Jul. 8, 2021

(51) Int. Cl.
| | | |
|---|---|---|
| G06F 21/36 | (2013.01) |
| G06N 3/00 | (2006.01) |
| H04L 9/32 | (2006.01) |
| G06F 16/23 | (2019.01) |
| G06T 19/20 | (2011.01) |
| G06F 3/01 | (2006.01) |
| G06T 15/60 | (2006.01) |

(52) U.S. Cl.
CPC .............. *G06F 21/36* (2013.01); *G06F 3/013* (2013.01); *G06F 16/2379* (2019.01); *G06N 3/006* (2013.01); *G06T 15/60* (2013.01); *G06T 19/20* (2013.01); *H04L 9/3231* (2013.01); *G06T 2200/24* (2013.01); *G06T 2219/2004* (2013.01); *G06T 2219/2016* (2013.01)

(58) Field of Classification Search
CPC ........ G06F 21/36; G06T 15/60; G06T 19/006
See application file for complete search history.

(56) References Cited

U.S. PATENT DOCUMENTS

| | | | |
|---|---|---|---|
| 2018/0107816 A1* | 4/2018 | Wu | ........................ H04W 12/68 |
| 2018/0109510 A1* | 4/2018 | Tommy | .................. G06F 21/316 |
| 2018/0285538 A1* | 10/2018 | Zhu | .......................... G06F 21/36 |

OTHER PUBLICATIONS

George, C. et al., "Investigating the Third Dimension for Authentication in Immersive Virtual Reality and in the Real World," 2019 IEEE Conference on Virtual Reality and 3D User Interfaces (VR), Mar. 23-27, 2019 (9 pages).

(Continued)

*Primary Examiner* — Shivang I Patel
(74) *Attorney, Agent, or Firm* — Cesari & McKenna, LLP

(57) ABSTRACT

Methods and apparatuses are described for user authentication in a three-dimensional (3D) alternative reality software application. A computing device coupled to an alternative reality viewing device generates a 3D virtual environment for display in the alternative reality viewing device, the 3D virtual environment comprising a plurality of 3D objects. The computing device identifies a subset of the plurality of 3D objects selected by the user of the alternative reality viewing device. The computing device captures a first set of actions of the user with respect to the subset of 3D objects, including recording a sequence of the first set of actions. The computing device generates a multidimensional authentication credential for the user based upon the first set of actions and stores the multidimensional authentication credential in a database.

28 Claims, 15 Drawing Sheets

(56) References Cited

OTHER PUBLICATIONS

George, C. et al., "Seamless and Secure VR: Adapting and Evaluating Established Authentication Systems for Virtual Reality," USEC '17, Feb. 26, 2017, San Diego, CA (12 pages).
Gurary, J. et al., "Leveraging 3D Benefits for Authentication," Int. J Communications, Network and System Sciences, 10, 324-338, Sep. 4, 2017 (15 pages).

\* cited by examiner

USER AUTHENTICATION IN A THREE-DIMENSIONAL (3D) ALTERNATIVE REALITY SOFTWARE APPLICATION

TECHNICAL FIELD

This application relates generally to methods and apparatuses, including computer program products, for user authentication in a three-dimensional (3D) alternative reality software application.

BACKGROUND

Generally, alternative reality software applications provide for an experience in which a user's real-world viewing perspective is replaced by or enhanced with a virtual 3D environment. In the context of this application, the term "alternative reality" encompasses all different types of virtual experiences, including but not limited to: virtual reality (VR), augmented reality (AR), mixed reality (MR), extended reality (XR) and others. A user wears a headset or similar apparatus that includes specialized display devices to render the virtual environment to the user, and the headset can include certain components (e.g., gyroscope(s), accelerometer(s), magnetometer(s), etc.) that detect and capture the user's head movements in order to update the virtual environment in response to the movements in a seamless, real-time manner. Exemplary headsets comprise the VIVE™ and VIVE Pro™ available from HTC Corporation, the Oculus Rift™ available from Facebook Technologies, LLC, and the Sony Playstation™ VR headset available from Sony Corporation.

Traditionally, due to the nature of the user interface, alternative reality software applications have lacked means to provide robust user authentication, instead relying on more simple methodologies within the alternative reality experience (such as entry of a password using a virtual keyboard or other type of data entry interface, or a series of straightforward gestures or movements) or reliance on a cumbersome physical user interface device attached to the alternative reality headset. In either scenario, the user's password is susceptible to being stolen by an onlooker who can match the user's movements or deduce which keys are pressed during entry of the password).

Other types of more advanced user authentication in the alternative reality environment also fall short of providing robust protection. For example, some applications may present a 3D setting in which a user can interact with one or more virtual objects as a means to authenticate to the alternative reality software application. Typically, these types of user authentication methods leverage simplistic object selection techniques, where the objects do not interact with each other, appear as or act like real-world objects, move to different locations, and/or change appearance during the authentication routine. In addition, many virtual authentication methodologies do not account for the user's movement, gaze, or position during authentication as a facet of the overall authentication parameters.

SUMMARY

Therefore, what is needed are methods and systems that incorporate a complex, multi-faceted user authentication mechanism in an alternative reality software application to provide secure, user-specific access to the functionality of the software application and further prevent onlookers from determining the user authentication credential by matching the user's movements or guessing a password input using virtual or physical user interfaces or devices.

The invention, in one aspect, features a system for user authentication in a three-dimensional (3D) alternative reality software application. The system includes an alternative reality viewing device that displays a 3D virtual environment to a user thereof. The system includes a computing device coupled to the alternative reality viewing device. The computing device comprises a memory to store computer-executable instructions and a processor that executes the computer-executable instructions. The computing device generates the 3D virtual environment for display in the alternative reality viewing device, the 3D virtual environment comprising a plurality of 3D objects. The computing device identifies a subset of the plurality of 3D objects selected by the user of the alternative reality viewing device. The computing device captures a first set of actions of the user with respect to the subset of 3D objects, including recording a sequence of the first set of actions, the actions comprising one or more of: (i) positioning at least two of the 3D objects in the subset relative to each other, (ii) causing an interaction between at least two of the 3D objects in the subset, (iii) causing an alteration to one or more visual characteristics of at least one 3D object in the subset, (iv) moving at least one 3D object in the subset, (v) holding a gaze of the alternative reality viewing device for an amount of time in relation to at least one 3D object in the subset, or (vi) moving to a different location in the 3D virtual environment with respect to at least one 3D object in the subset. The computing device generates a multidimensional authentication credential for the user based upon the first set of actions and stores the multidimensional authentication credential in a database.

The invention, in another aspect, features a computerized method of user authentication in a three-dimensional (3D) alternative reality software application. An alternative reality viewing device displays a 3D virtual environment to a user thereof. A computing device coupled to the alternative reality viewing device generates the 3D virtual environment for display in the alternative reality viewing device, the 3D virtual environment comprising a plurality of 3D objects. The computing device identifies a subset of the plurality of 3D objects selected by the user of the alternative reality viewing device. The computing device captures a first set of actions of the user with respect to the subset of 3D objects, including recording a sequence of the first set of actions, the actions comprising one or more of: (i) positioning at least two of the 3D objects in the subset relative to each other, (ii) causing an interaction between at least two of the 3D objects in the subset, (iii) causing an alteration to one or more visual characteristics of at least one 3D object in the subset, (iv) moving at least one 3D object in the subset, (v) holding a gaze of the alternative reality viewing device for an amount of time in relation to at least one 3D object in the subset, or (vi) moving to a different location in the 3D virtual environment with respect to at least one 3D object in the subset. The computing device generates a multidimensional authentication credential for the user based upon the first set of actions and stores the multidimensional authentication credential in a database.

Any of the above aspects can include one or more of the following features. In some embodiments, at least a portion of the plurality of 3D objects are personalized to the user. In some embodiments, the multidimensional authentication credential is based upon the sequence of the first set of actions. In some embodiments, the multidimensional authentication credential is independent of the sequence of the first set of actions.

In some embodiments, the computing device receives a request to authenticate the user, the request including a second set of actions of the user with respect to the subset of 3D objects. In some embodiments, the computing device compares the second set of actions to the multidimensional authentication credential and generates an authentication score based upon the comparison. In some embodiments, the computing device rejects the request to authenticate the user when the authentication score is below a predetermined threshold value. In some embodiments, the computing device approves the request to authenticate the user when the authentication score is at or above a predetermined threshold value.

In some embodiments, the computing device applies one or more real-world physics rules to at least one of the 3D objects in the subset during capture of the first set of actions. In some embodiments, the multidimensional authentication credential comprises the one or more real-world physics rules applied by the computing device during capture of the first set of actions. In some embodiments, the computing device applies the one or more real-world physics rules to at least one of the 3D objects during capture of a second set of actions of the user as part of an authentication request.

In some embodiments, positioning at least two of the 3D objects in the subset relative to each other comprises placing one of the at least two 3D objects in relation to a light source in the 3D virtual environment such that a shadow of the placed 3D object is positioned relative to the other 3D objects. In some embodiments, the first set of actions further comprises removing at least one of the 3D objects in the subset from the 3D virtual environment. In some embodiments, causing an alteration to one or more visual characteristics of at least one 3D object in the subset comprises distorting an appearance of the at least one 3D object in the 3D virtual environment.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
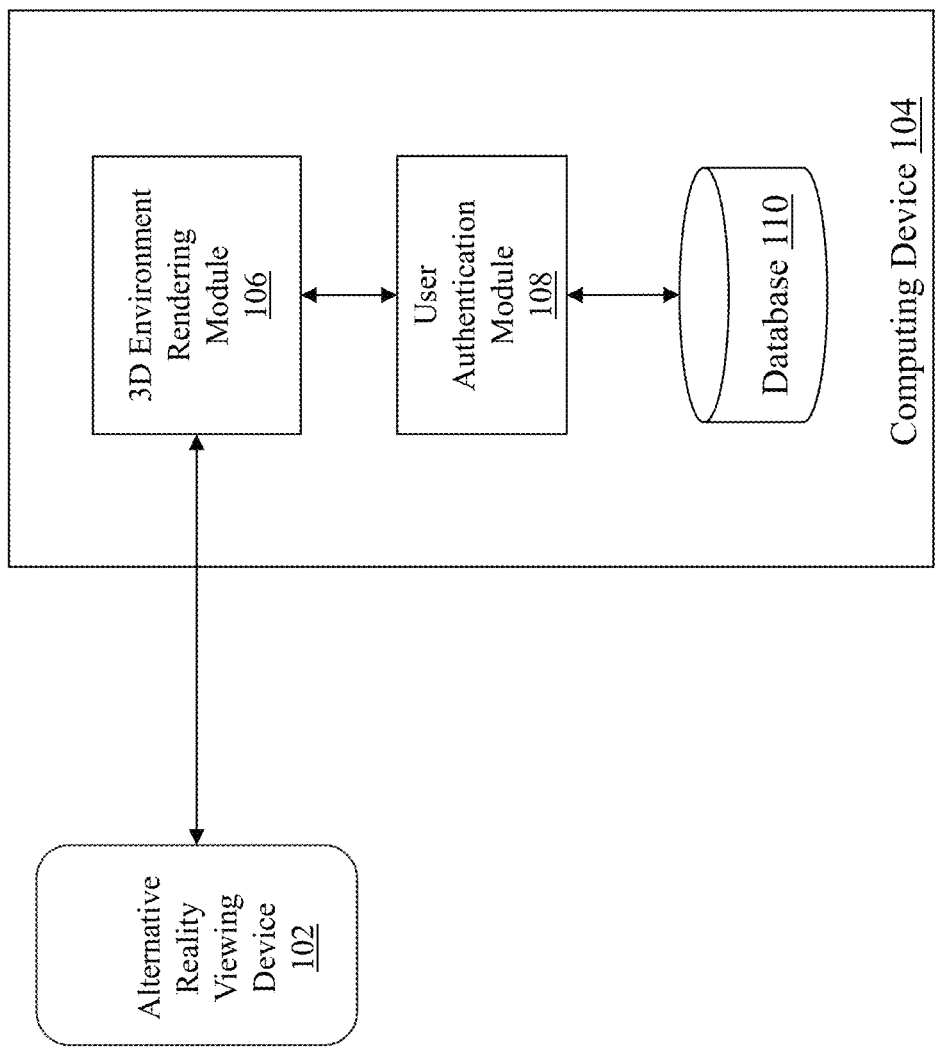
FIG. 1 is a block diagram of a system for user authentication in a three-dimensional (3D) alternative reality software application.

FIG. 1 is a block diagram of a system 100 for user authentication in a three-dimensional (3D) alternative reality software application. The system 100 includes an alternative reality viewing device 102 and a computing device 104 that includes a 3D environment rendering module 106, a user authentication module 108, and a database 110.

The alternative reality viewing device 102 comprises an apparatus (e.g., a headset, goggles, glasses, etc.) that enable a user to view a 3D environment (also called a 'raw camera')—such as a virtual reality (VR) environment, an augmented reality (AR) environment, a mixed reality (MR) environment, and/or an extended reality (XR) environment. Exemplary alternative reality viewing devices 102 can include, but are not limited to, the VIVE™ and VIVE Pro™ available from HTC Corporation, the Oculus Rift™ available from Facebook Technologies, LLC, and the Sony Playstation™ VR headset available from Sony Corporation. The alternative reality viewing device 102 connects to the computing device 104 to receive data corresponding to a rendered 3D environment from the computing device 104 for display on the device 102. In some embodiments, the alternative reality viewing device 102 is coupled to the computing device 104 via a physical connection (e.g., one or more cables hardwired using proprietary hardware connections to HDMI, USB and/or Display-ports of the computing device 104). In some embodiments, the alternative reality viewing device 202 is coupled to the computing device 104 via a wireless connection (e.g., WiFi, Bluetooth™, WiGig™ from Intel Corporation). In some embodiments, a communications network (e.g., LAN, WAN) is located between the alternative reality viewing device 102 and the computing device 104. Further, in some embodiments, the alternative reality viewing device 102 includes one or more devices and/or apparatuses coupled to the viewing device, such as gloves, handsets, joysticks, keypads, and the like that enhance the user's ability to interact with the alternative reality environment.

The computing device 104 is a device including specialized hardware and/or software modules that execute on a processor and interact with memory modules of the computing device 104, to receive data from other components of the system 100, transmit data to other components of the system 100, and perform functions for user authentication in a three-dimensional (3D) alternative reality software application as described herein. The computing device 104 includes a 3D environment rendering module 106, and a user authentication module 108 that execute on the processor of the computing device 104. In some embodiments, the modules 106, 108 are specialized sets of computer software instructions programmed onto one or more dedicated processors in the computing device 104 and can include specifically-designated memory locations and/or registers for executing the specialized computer software instructions.

Although the computing modules 106, 108 are shown in FIG. 1 as executing within the same computing device 104, in some embodiments the functionality of the modules 106, 108 can be distributed among a plurality of computing devices. As shown in FIG. 1, the computing device 104 enables the modules 106, 108 to communicate with each other, and with database 110, in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. For example, the computing device 104 can be a desktop or laptop computer coupled to the alternative reality viewing device 102 via a physical connection. In another example, the computing device 104 can be a server computing device coupled to the alternative reality viewing device 102 via a logical network connection. The exemplary functionality of the modules 106, 108 is described in detail below.

The database 110 is a computing module of the computing device 104 that is configured to receive, generate, and store specific segments of data relating to the process of user authentication in a three-dimensional (3D) alternative reality software application as described herein. In some embodiments (as shown in FIG. 1), all or a portion of the database 110 can be integrated with the computing device 104. In some embodiments, the database 110 can be located on a separate computing device or devices, available either local connection or remote connection (e.g., cloud-based services). The database 110 can comprise one or more databases configured to store portions of data used by the other components of the system 100, as will be described in greater detail below. In some embodiments, the database 110 functions as a data repository to store computing files in memory and/or on disk. For example, the database 110 can be remote accessed via a LAN/WAN, or the database 110 can be internal to the computing device 104.

Figure 2:
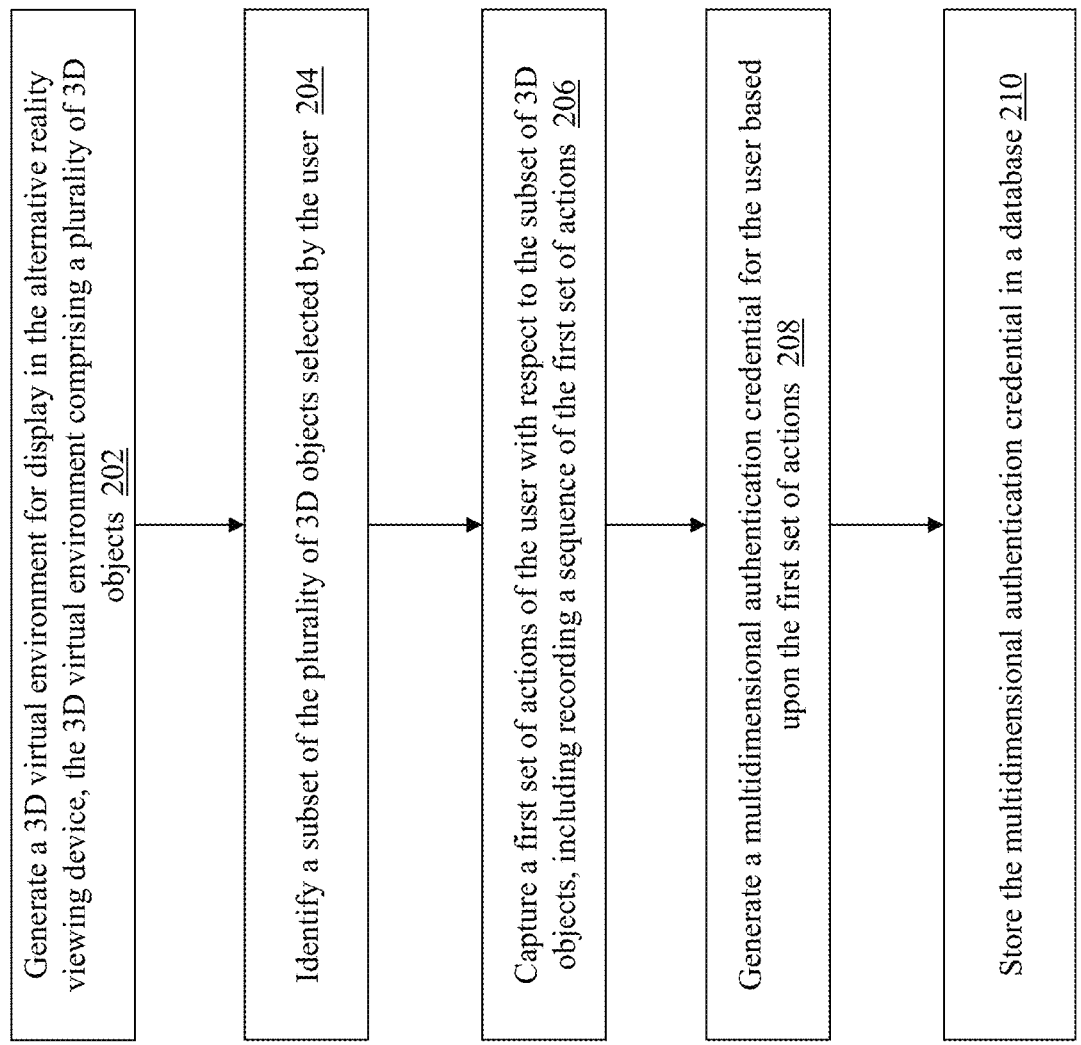
FIG. 2 is a flow diagram of a computerized method of user authentication in a three-dimensional (3D) alternative reality software application.
Figure 3A:
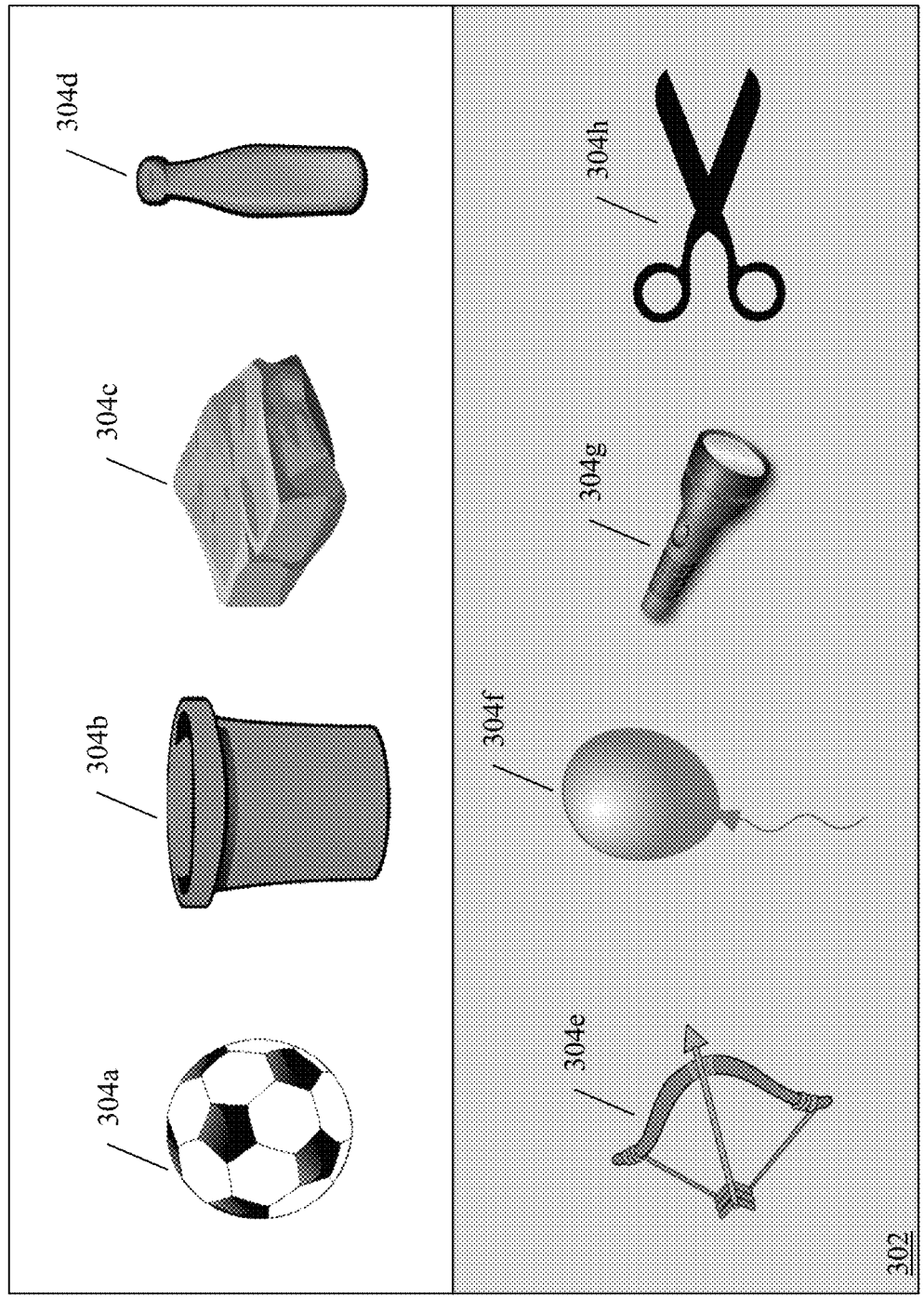
FIGS. 3A-3F comprise a user interface process flow for generating a multidimensional user authentication credential in a three-dimensional (3D) alternative reality software application.

FIG. 2 is a flow diagram of a computerized method 200 of user authentication in a three-dimensional (3D) alternative reality software application, using the system 100 of FIG. 1. The 3D environment rendering module 106 generates (202) a 3D virtual environment for display in the alternative reality viewing device 102. In some embodiments, the 3D virtual environment comprises a 3D setting, such as a landscape or room, in which the user is placed. The 3D virtual environment also comprises a plurality of 3D objects that can be arranged or distributed throughout the 3D setting such that at least a portion of the 3D objects are visible to the user. FIG. 3A is a diagram of an exemplary 3D setting and associated objects as generated by the 3D environment rendering module 106. As shown in FIG. 3A, the 3D setting comprises a room with a floor 302 and the plurality of 3D objects 304a-304h comprise a variety of different recognizable objects, such as: a soccer ball 304a, a bucket 304b, a rock 304c, a bottle 304d, a bow and arrow 304e, a balloon 304f, a flashlight 304g, and a pair of scissors 304h. It should be appreciated that these objects 304a-304h are exemplary and that other types or variations of objects can be used within the scope of the technology described herein. For example, the computing device 104 can be configured to present 3D objects that are personalized to the user (in the context of a narrative, as will be described below).

The user can interact with these objects 304a-304h in specific ways to both generate a multidimensional authentication credential that is linked to the user (e.g., during an authentication credential generation phase), which enables the user to input the multidimensional authentication credential after generation (e.g., during a log-in phase for the application)—each of which is described in further detail below.

During the authentication credential generation phase, such as when a user is changing his or her authentication credential, or when a new user is signing into the alternative reality application for the first time, the user authentication module 108 identifies (204) a subset of the plurality of 3D objects 304a-304h selected by the user. In some embodiments, the user can select a subset of the 3D objects by, e.g., maintaining a gaze of the alternative reality viewing device 102 at a specific object for a certain period of time. For example, using device positioning and orientation data received from one or more sensors in the alternative reality computing device 102, the 3D environment rendering module 106 can calculate a head gaze vector for the user's head that indicates where the user is looking within the virtual space. When the head gaze vector is associated with a specific object for a particular period of time (e.g., 3 seconds, 5 seconds, 10 seconds), the user authentication module 108 determines that the user has selected that 3D object to be included in the authentication credential creation process described herein. In some embodiments, the 3D environment rendering module 106 can receive indicia from the alternative reality viewing device 102 that the user has pointed to and/or clicked on a number of different 3D objects using, e.g., his or her hands within the virtual environment and/or a user input device coupled to the virtual environment.

In some embodiments, the user authentication module 108 requires the user to select a minimum number of 3D objects for inclusion in the authentication credential. In these embodiments, the user authentication module 108 does not proceed to the next step of the credential generation process until the user has completed selection of the required number of objects. In some cases, if the user does not select the required number of objects within a defined time frame (e.g., 1 minute, 2 minutes, 5 minutes), the user authentication module 108 does not save any object selections made by the user and returns the virtual environment to a default state.

Figure 3B:
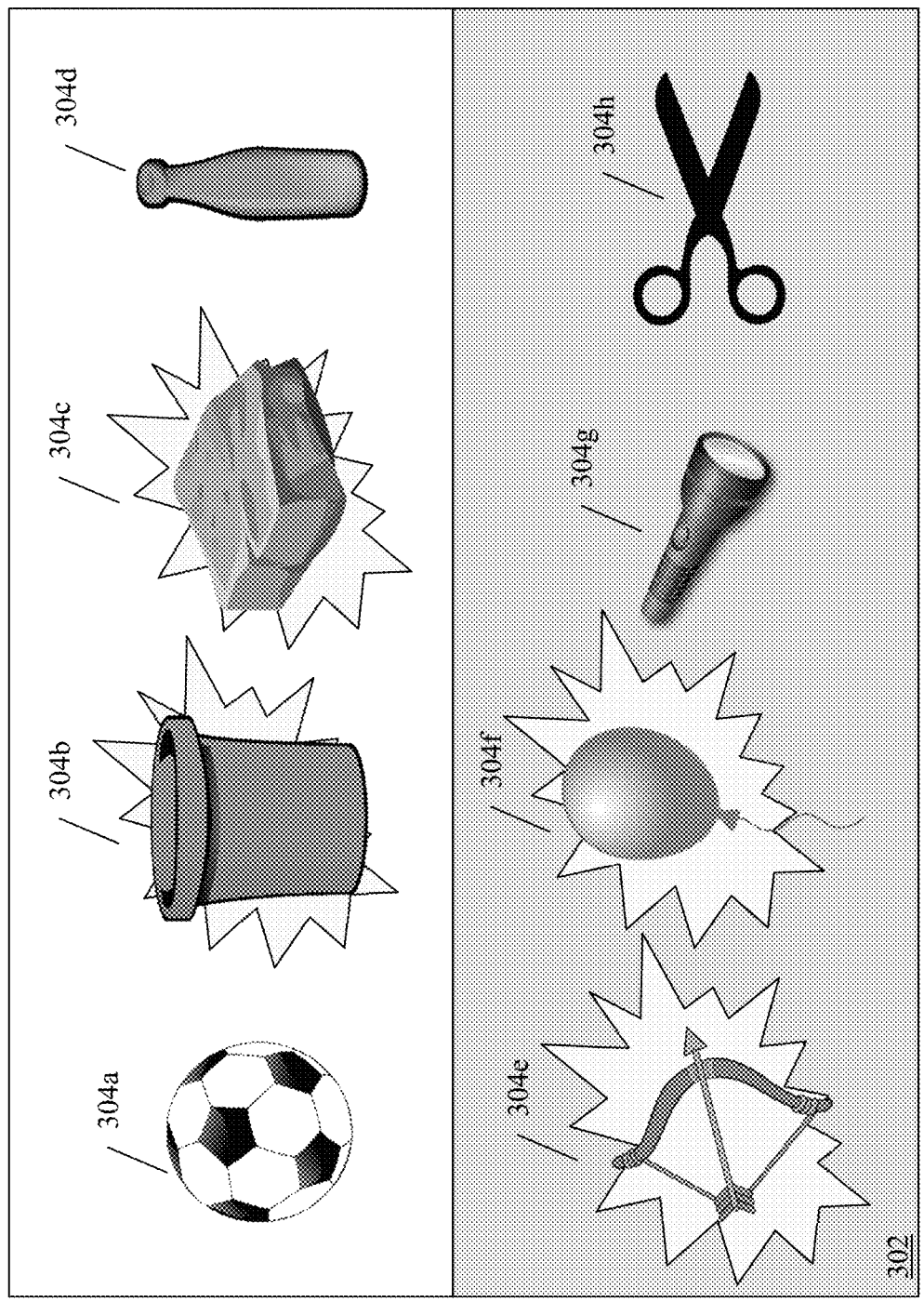
Figure 3C:
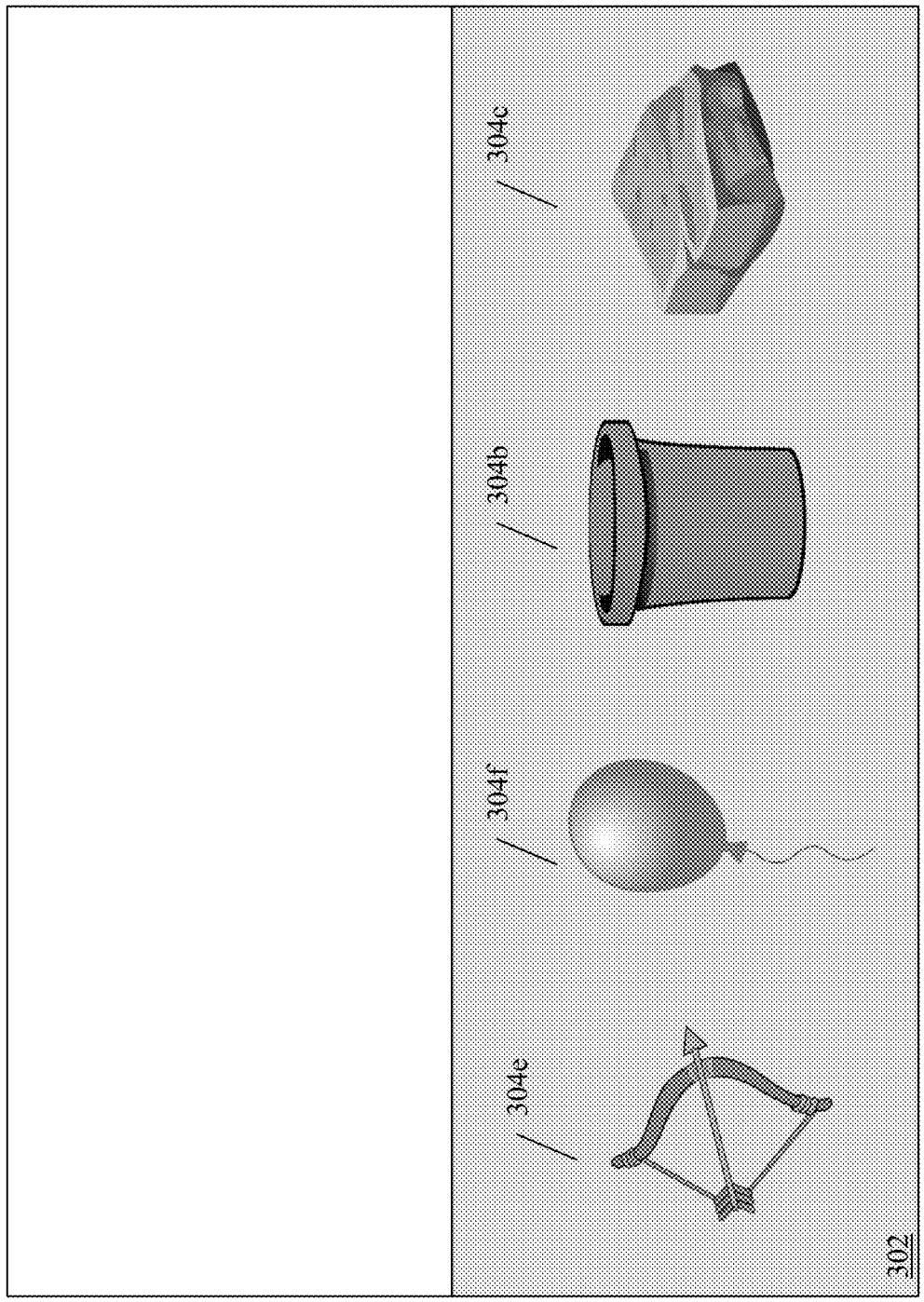

FIGS. 3A-3F comprise a user interface process flow for generating a multidimensional authentication credential in a 3D virtual environment, using the system 100 of FIG. 1. In the example described herein with respect to FIGS. 3A-3F, the user authentication module 108 requires the user to select four 3D objects. FIG. 3A is a diagram of the 3D setting and associated objects of FIG. 3A, with four objects having been selected by the user. As shown in FIG. 3B, the user has selected the bucket 304b, rock 304c, bow and arrow 304e, and balloon 304f. In some embodiments, a visual indicator is added to the selected objects (such as the star shape positioned underneath each selected object as shown in FIG. 3B) to confirm to the user which objects are selected. The unselected 3D objects 304a, 304d, 304g, and 304h can then be removed from the virtual environment and the remaining, selected 3D objects 304b, 304c, 304e, and 304f can be arranged in a particular location in the virtual environment (as shown in FIG. 3C, where the objects are placed on the floor of the room 302), although this arrangement is not required.

Next, the user authentication module 108 captures 206 a first set of actions of the user with respect to the subset of 3D objects that have been selected (i.e., bucket 304b, rock 304c, bow and arrow 304e, and balloon 304f), including recording a sequence of the first set of actions. In some embodiments, the actions can include one or more of: (i) positioning at least two of the 3D objects in the subset relative to each other, (ii) causing an interaction between at least two of the 3D objects in the subset, (iii) causing an alteration to one or more visual characteristics of at least one 3D object in the subset, (iv) moving at least one 3D object in the subset, (v)

holding a gaze of the alternative reality viewing device for an amount of time in relation to at least one 3D object in the subset, or (vi) moving to a different location in the 3D virtual environment with respect to at least one 3D object in the subset.

Figure 3D:
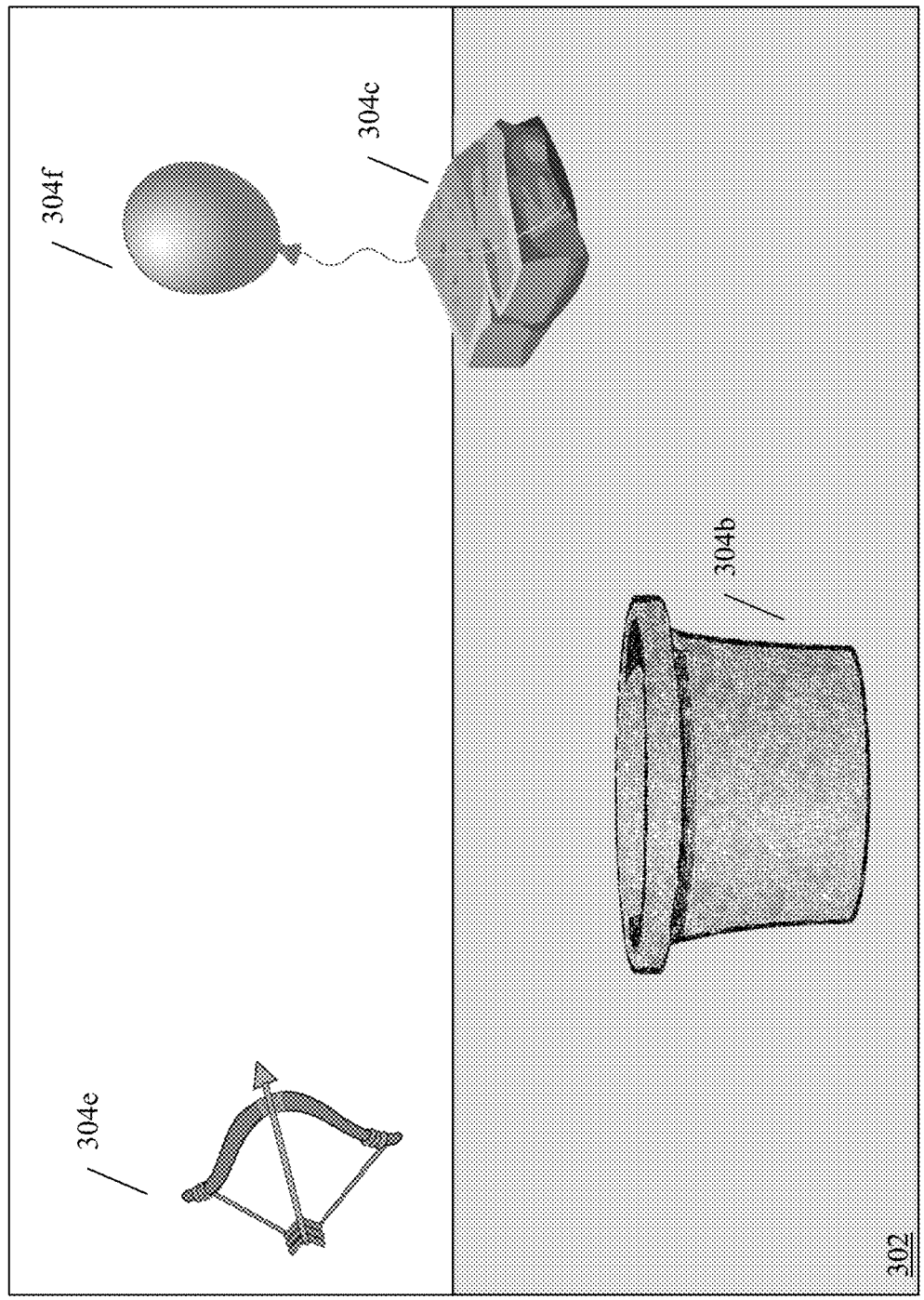
Figure 3E:
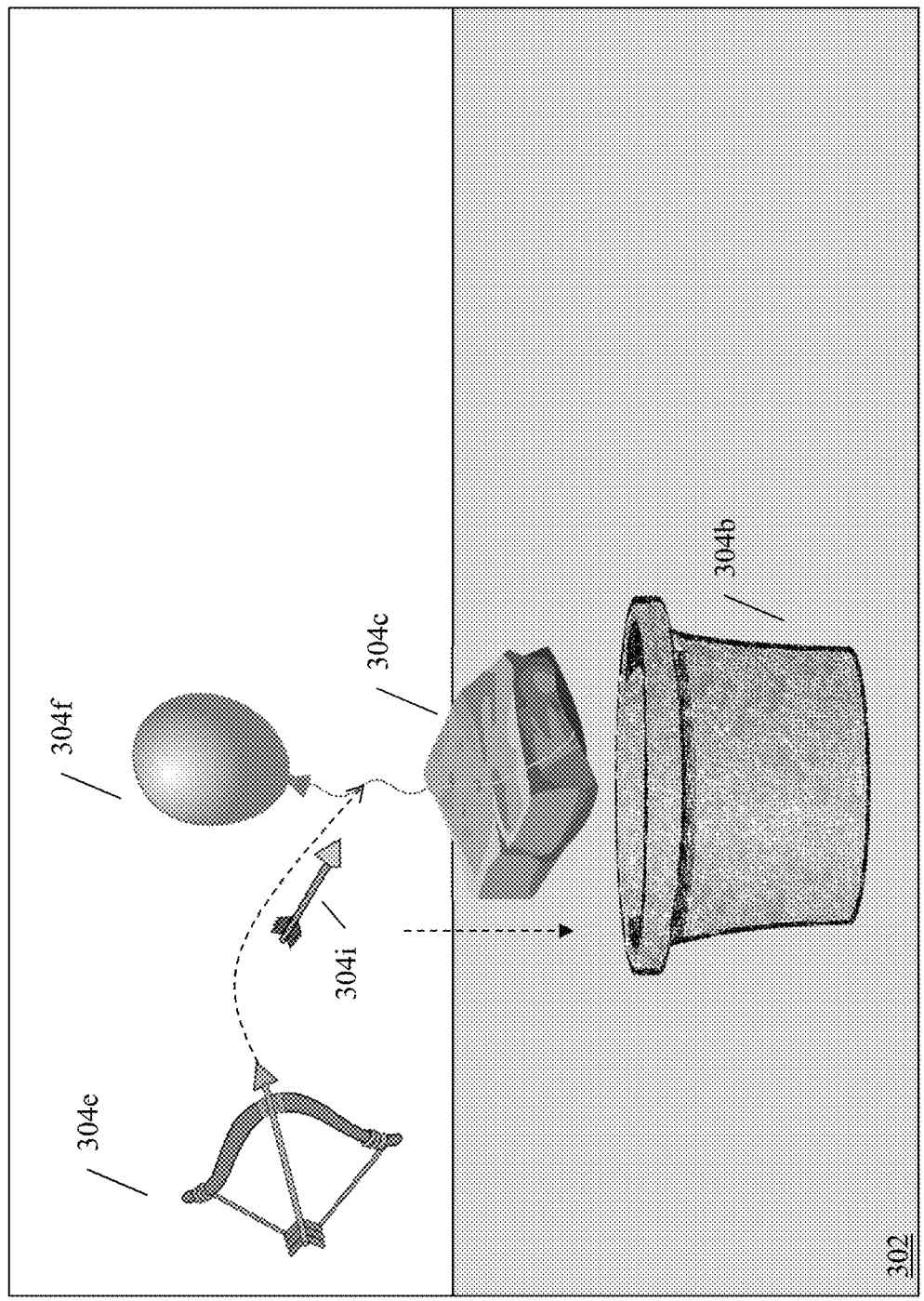
Figure 3F:
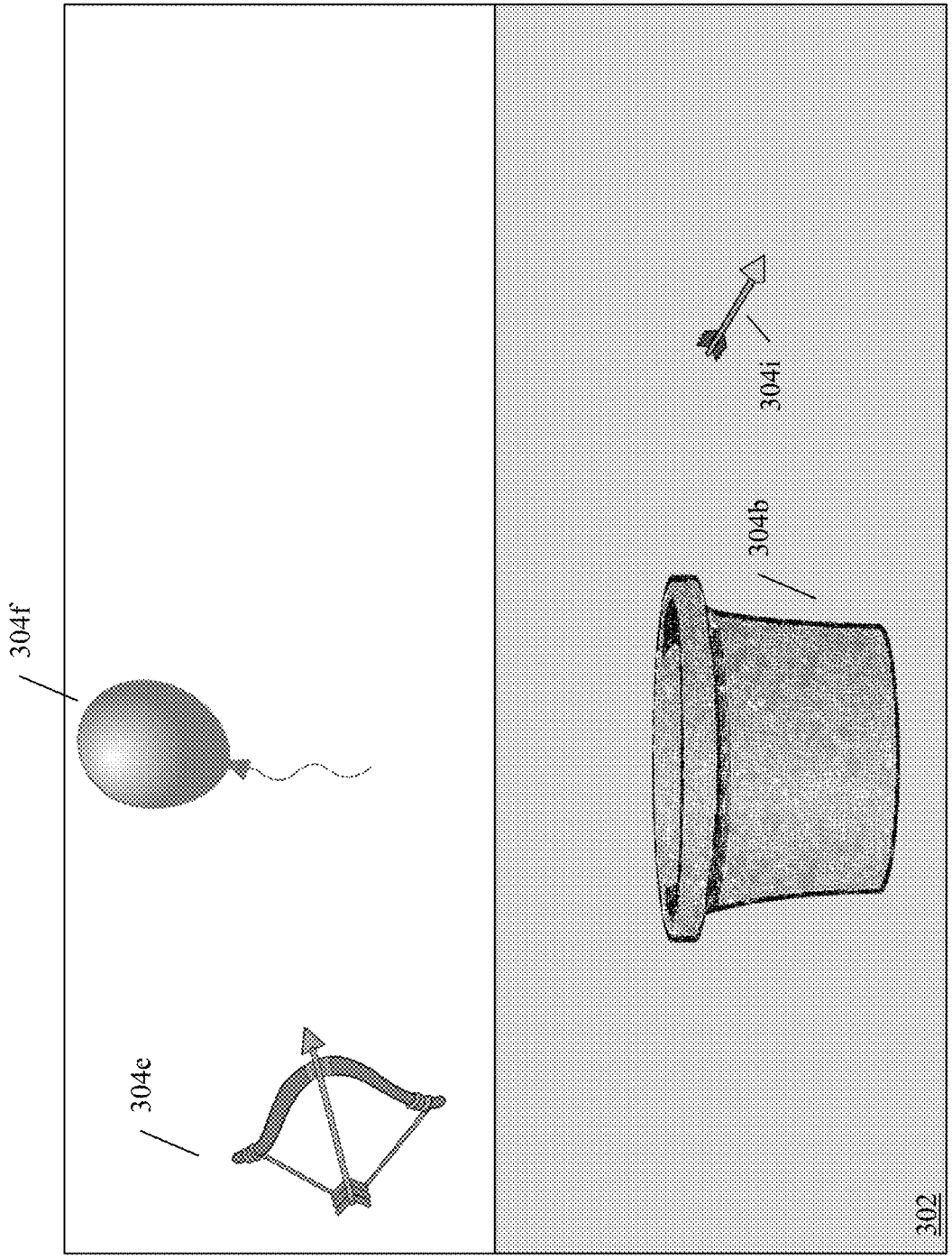

FIGS. 3D-3F are diagrams showing how the selected 3D objects 304b, 304c, 304e, and 304f in the virtual environment change as the first set of actions are performed by the user. As shown in FIG. 3D, the bow and arrow 304e and the balloon 304f have been moved to the upper portion of the environment 302, the string of the balloon 304f has been tied around the rock 304c (so that the balloon 304f is carrying the rock in the air), and the bucket 304b has moved to the center of the room. In addition, the user has changed the color of the bucket 304b (e.g., going from dark gray to light gray) and made the bucket larger. It should be appreciated that each of these actions would typically occur sequentially, in that the user would perform one action before the next (e.g., move the bow and arrow 304e before moving the balloon 304f, and before tying the rock 304c to the balloon 304f, etc.).

The user authentication module 108 captures a plurality of data points with respect to each action performed by the user in relation to the selected 3D objects. In some embodiments, the user authentication module 108 captures the position and orientation of the alternative reality viewing device 102 (as well as the position and orientation of the user's hands and/or one or more user input devices coupled to the device 102, if that functionality is available) prior to, during, and after each action is performed. For example, before the user has interacted with any of the objects (as in FIG. 3C), the user authentication module 108 captures the position and orientation of the alternative reality viewing device 102 (e.g., to determine head gaze vector as described above) and the user authentication module 108 further captures the position information for each of the 3D objects within the virtual environment (such as absolute x, y, z coordinates and/or x, y, z coordinates relative to the viewpoint of the user as determined from the position and orientation data of the alternative reality viewing device 102). This can be considered as the first dimension to be used in generating in the multidimensional authentication credential as described herein.

Then, as each object is moved or otherwise interacted with, the computing device 104 again captures the position and orientation data for the viewing device 102 (and the user's hands and/or any associated user input devices) and the position data, movement path data, appearance data, relationship data, and/or other types of data associated with the user interaction for each of the 3D objects in the virtual environment which all together comprises the first set of actions. For each action, the user authentication module 108 captures the above data as another dimension to be used in generating the multidimensional authentication credential. In the example shown in FIG. 3D, the user authentication module 108 can capture the following actions:

1) Move bow and arrow 304e to coordinates x1, y1, z1;
2) Move balloon 304f to coordinates x2, y2, z2;
3) Move rock 304c to coordinates x3, y3, z3;
4) Attach balloon 304f to rock 304c;
5) Move bucket 304b to coordinates x4, y4, z4
6) Change color of bucket 304b;
7) Change size of bucket 304b.

In some embodiments, the user authentication module 108 can then generate a multidimensional authentication credential based upon the above first set of actions. However, in other embodiments, the user authentication module 108 can capture additional actions to be included in the first set of actions, as shown in FIGS. 3E and 3F. Turning to FIG. 3E, the additional actions are:

8) Move balloon 304f to coordinates x5, y5, z5 so that it is positioned over bucket 304b (rock 304c moves automatically because it is tied to balloon);
9) Shoot arrow from bow and arrow 304e to cut balloon string.

As a result of these actions, the rock 304c falls into the bucket 304b, moving to coordinates x4, y4, z4 and disappearing from the user's view, and the balloon 304f floats upward to coordinates x6, y6, z6 (as shown in FIG. 3F). In some embodiments, a new object arrow 304i appears within the virtual environment and ends up on the floor at coordinates x7, y7, z7 after cutting the balloon string. It should be appreciated that, in some embodiments, the computing device 104 applies real-world physics rules to the 3D objects in the virtual environment so that the user's interactions with the objects appear more natural. In addition, this provides the benefit of using the real-world physics rules (and/or the corresponding position and movement data generated through applying the physics rules) to the data for each action in the first set of actions, thereby enabling the generation of a robust multidimensional authentication credential. For example, as shown in FIGS. 3E and 3F, the arrow 304i follows a path based upon, e.g., its launch angle from the bow 304e, an amount of force applied to the bowstring by the user when shooting the arrow, and gravitational force exerted on the arrow—causing the arrow to move in an arcing motion through the balloon string and then to the floor. In some embodiments, the computing device 104 can further influence the arrow's movement by, e.g., introducing wind speed or other physical resistance factors (such as water) to change the trajectory and path of the arrow 304i.

It should further be appreciated that other types of actions can be incorporated into the first set of actions. As noted above, an action may be that the user moves within the 3D environment in relation to the 3D objects—such as moving to the opposite side of the objects or rotating around one or more objects. Another action can be the user moving his or her head to gaze at different objects—for example, the first set of actions may include gazing at the bow and arrow 304e before (or after) moving it to a particular position. Still other actions can include destroying an object or removing an object from the scene, orienting an object with respect to a light source positioned in the 3D environment (so that a shadow of the object is aligned with and/or covering another object), merging two or more objects together to generate a new 3D object, distorting and/or undistorting a 3D object, incorporating portals to move objects from one location to the next, and the like.

In some embodiments, the user authentication module 108 can incorporate a sequence of the first set of actions into the credential generation process—so that when the user comes back to the alternative reality software application to authenticate, the credential requires that the actions are performed in a specific order. Using the above example from FIGS. 3A-3F, the user authentication module 108 can require that the bow and arrow 304e is moved first, then the balloon 304f is moved, and so on. When the user authentication module 108 determines that the user has not performed the actions in the specific order, then the user authentication module 108 can deny access to the software application, return the authentication process to its initial state, and ask the user to try again.

In other embodiments, the user authentication module 108 does not incorporate the sequence of the first set of actions into the credential generation process. In these embodiments, the credential generation process can be considered 'state-based,' meaning that the user authentication module 108 only requires that (i) an initial state of the 3D environment and 3D objects is captured (that is, the user selected the correct 3D objects as the subset), (ii) a final state of the 3D environment and 3D objects is captured, and (iii) optionally, one or more interim states of the 3D environment and 3D objects are captured. Applying this to the example of FIGS. 3A-3F, the user authentication module 108 captures the initial state (as in FIG. 3C) and the final state (as in FIG. 3F) as the authentication credential—meaning that, during a log-in process where the user is attempting to access the software application, as long as the objects 304b, 304c, 304e, and 304f (and optionally 304i) end up in the right locations within the virtual environment—the bow and arrow 304e is at coordinates x1, y1, z1; the balloon 304f is at coordinates x6, y6, z6; the rock 304c and bucket 304b are at coordinates x4, y4, z4, and optionally the arrow 304i is at coordinates x7, y7, z7—then the authentication credential is considered valid and access to the application is granted.

Once the user has completed the first set of actions, the user authentication module 108 can use the data captured with respect to the first set of actions (as described above) to generate (208) a multidimensional authentication credential for the user. In some embodiments, the user authentication module 108 uses an algorithm to convert the captured data into an alphanumeric string (or numeric vector) that can be stored as the authentication credential. In some embodiments, the user authentication module 108 further encrypts or obscures the underlying authentication credential (e.g., via hashing) so that the authentication credential cannot be determined without requiring a complex decryption process—thereby adding another layer of security to the credential.

Figure 4:
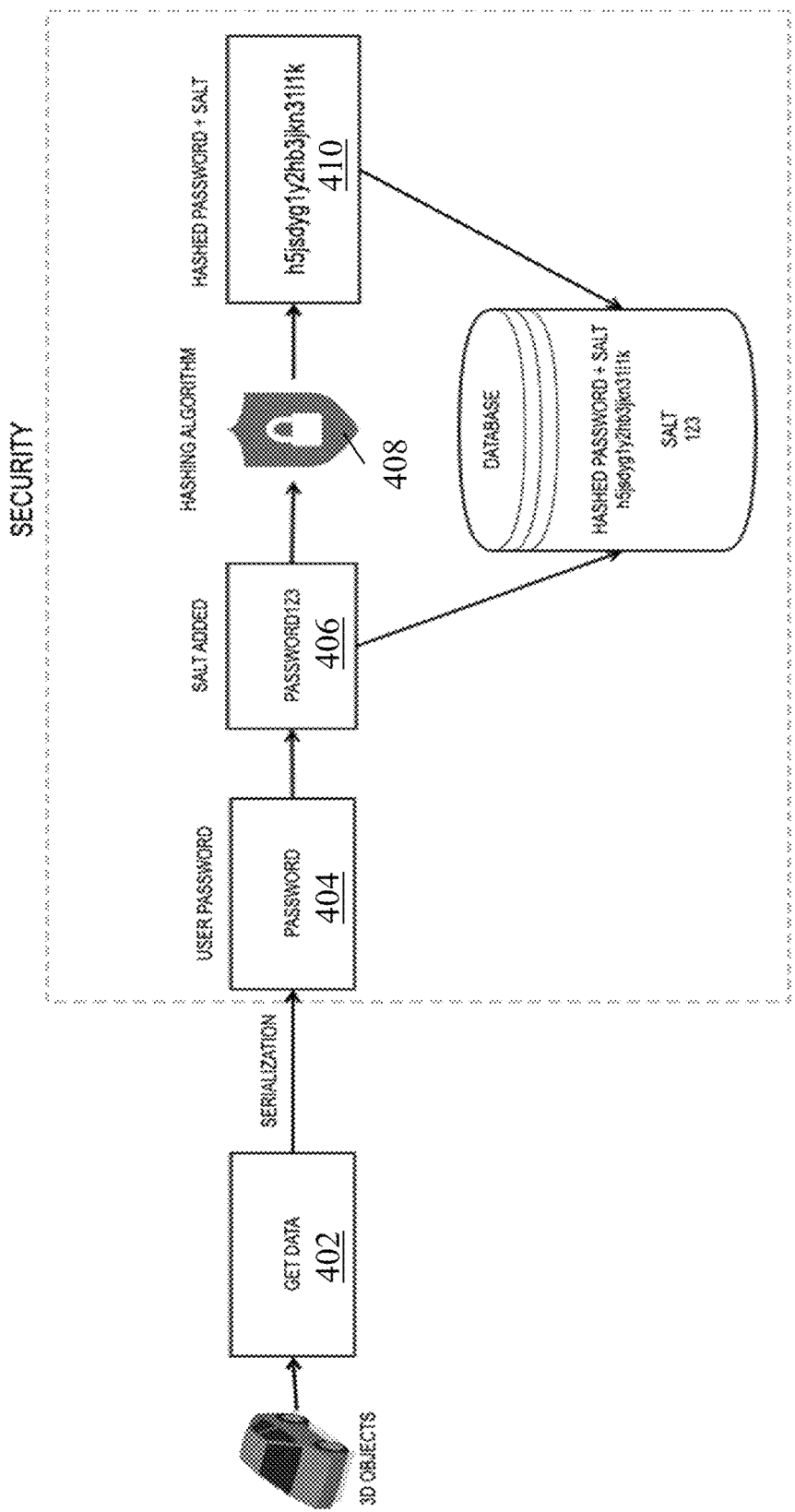
FIG. 4 is a flow diagram of a computerized method 400 for generating a multidimensional authentication credential for the user.

FIG. 4 is a flow diagram of a computerized method 400 for generating a multidimensional authentication credential for the user. As shown in FIG. 4, the user authentication module 108 converts information relating to the 3D objects within the virtual environment into a multidimensional authentication credential. At step 402, the user authentication module 108 generates a set of data elements that correspond to certain attributes of each of the 3D objects in the environment. For example, the user authentication module 108 can extract certain serializable data corresponding to the 3D objects from the alternative reality software application including, but not limited to, primitive data types (e.g., int, float, double, bool, string, etc.). It should be appreciated that any or all of the properties from the 3D objects in the virtual environment can be converted to any of the primitive data types described herein.

Figure 5:
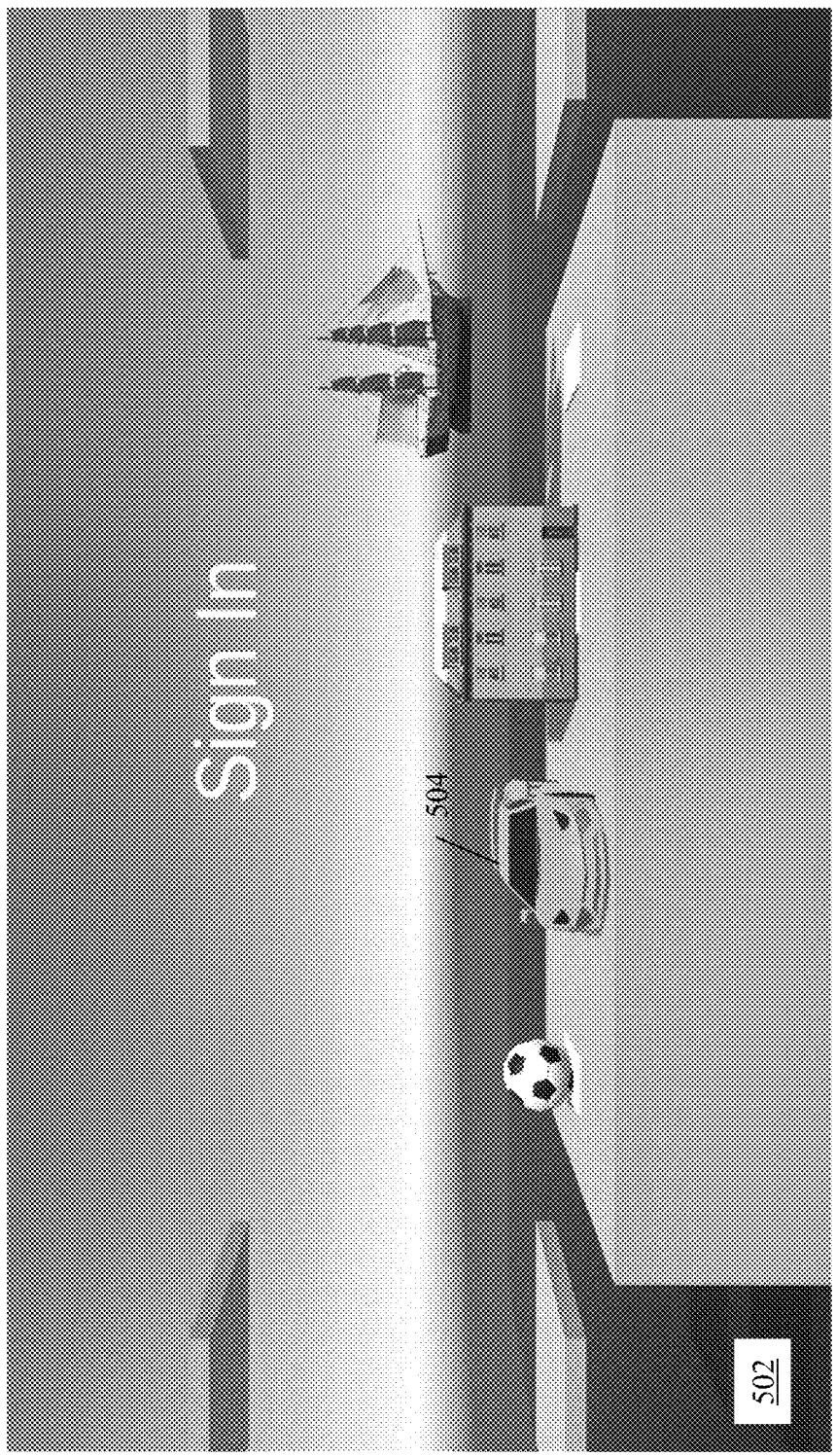
FIG. 5 is a diagram of a user interface in a three-dimensional (3D) alternative reality software application.

Table 1 below provides an exemplary list of serializable data elements for a 3D object—such as the car 504 depicted in the virtual environment 502 of FIG. 5—that can be stored in, e.g., database 110:

TABLE 1

| Data Element Identifier | Data Value | Description |
| --- | --- | --- |
| Name | car | The name of the 3D object |
| Position | [1, 1, 3] | The x, y, z coordinates |
| Rotation | [45, 45, 90] | The x, y, z angles |
| Slot | 2 | The slot where the 3D object is placed |

TABLE 1-continued

| Data Element Identifier | Data Value | Description |
| --- | --- | --- |
| Colliding Objects | [table] | Other object(s) the 3D object is colliding with |
| Right Object | [house, ship] | The object(s) to the right of the 3D object |
| Left Object | [ball] | The object(s) to the left of the 3D object |
| Color | red | The color of the 3D object |
| Left Distance | 8 | The distance of the 3D object from the nearest object to the left |
| Right Distance | 10 | The distance of the 3D object from the nearest object to the right |
| Reflective | yes | Can the 3D object pass light for bouncing to another object or act as a mirror? |
| Cast | yes | Does the 3D object have the ability to cast a shadow or shine light? |
| Cast Angle | 22 | The user has to turn the object to a particular angle to cast shadow/shine light |
| Cast Target | [mirror, reflective] | The user sees the reflection from the cast object into the target object |

It should be appreciated that other types of data elements (instead of or in addition to those described above) can be captured and stored by the user authentication module 108 without departing from the scope of the technology described herein.

Turning back to FIG. 4, at step 404 the user authentication module 108 converts the serializable data elements generated for each 3D object (as described above) into a binary format, such as a string. In some embodiments, the binary string created by the user authentication module 108 in this step represents a 'password' associated with the user. Next, at step 406 the user authentication module 108 adds a random numeric or alphanumeric string (also called a salt) to the above-referenced binary string. Then, at step 408 the user authentication module 108 executes a hashing algorithm using the salted binary string as input to generate a hash password (see step 410). The user authentication module 108 then stores the hash password and the salt value in database 110 as the multidimensional authentication credential.

Turning back to FIG. 2, after the user authentication module 108 generates the multidimensional authentication credential, the user authentication module 108 stores (210) the authentication credential in database 110 as described above. In some embodiments, the user authentication module 108 stores a data set corresponding to the full first set of actions (including, e.g., the specific location, position, movement, relationship and/or appearance change data for the 3D objects and the position and orientation data for the alternative reality viewing device 102, for each action) in a table or other data structure in the database—either in addition to or instead of the multidimensional authentication credential generated by the user authentication module 108 using an algorithm as mentioned previously. In other embodiments, the user authentication module 108 stores just the multidimensional authentication credential (either encrypted or unencrypted) in the database 110.

Then, when the user returns to use the alternative reality software application, the user authentication module 108 can execute a login process to authenticate the user based upon the previously-generated multidimensional authentication credential. To initiate the log-in process, the user authentication module 108 can receive a request to authenticate the user, which includes a second set of actions of the user with respect to 3D objects in the virtual environment as described below. In some embodiments, the user authentication module 108 receives as part of the request a username or other criteria (e.g., PIN, ID number) that uniquely identifies the user, in order to retrieve the multidimensional authentication credential from database 110. In some embodiments, the user authentication module 108 and/or alternative reality viewing device 102 captures one or more biometric characteristics of the user (e.g., retina scan, fingerprint, etc.) in order to retrieve the credential from database 110. In some embodiments, the user authentication module 108 does not require the user to provide identifying information as above before initiating the log-in process.

The 3D environment rendering module 106 can display a plurality of 3D objects to the user (such as shown in FIG. 3A), at least some of which are the 3D objects previously used to generate the user's multidimensional authentication credential. The user selects the specific 3D objects that he or she used to create the authentication credential (as in FIG. 3B), and the 3D environment rendering module 106 presents the selected 3D objects to the user in the 3D environment (as in FIG. 3C). The user then performs a second set of actions using the selected 3D objects in an attempt to match the first set of actions that were recorded by the user authentication module 108 during the authentication credential generation process.

It should be appreciated that, in some embodiments, the user authentication module 108 forms periodic validation checks during the log-in process. For example, when the user does not select the correct objects (or the correct number of objects) or when the user performs an incorrect action, the user authentication module 108 can interrupt the login process, present an error message to the user (such as "authentication failed") and return the software application to a default state. In other embodiments, the user authentication module 108 can let the user proceed through an entire login process (letting the user select objects and interact with them as described above) before informing the user that authentication has failed. The latter embodiments provide for enhanced security for the authentication process, because an unauthorized user cannot try to guess which 3D objects should be selected and/or which actions should be performed.

Once the user has selected the 3D objects and performed the second set of actions, the user authentication module 108 can convert the second set of actions into a multidimensional credential (e.g., using the same or similar algorithm(s) as described above) and compare the credential from the second set of actions to the stored multidimensional authentication credential that was generated previously to determine whether the user is authorized to access the software application. In some embodiments, the user authentication module 108 compares data corresponding to each of the actions in the second set of actions to a corresponding action in the first set of actions in order to determine whether the user is authorized.

In some embodiments, the user authentication module 108 generates an authentication score based upon the comparison of the credential from the second set of actions to the stored authentication credential, and then uses the authentication score to determine whether to grant or deny access to the user. For example, the authentication score can be placed on a scale from 0 to 100, where 0 indicates no match and 100 indicates an exact match. As can be appreciated, the user authentication module 108 may incorporate a certain amount of tolerance for slight variations in the position, movement, and/or orientation of 3D objects (and of the alternative reality viewing device 102) during the log-in process, as compared to the authentication credential generation process. For example, during log-in, a user may not be able to place the bow and arrow 304e in precisely the same location (i.e., at the exact same x, y, z coordinates) as he or she placed the bow and arrow 304e during creation of the credential. As a result, the user authentication module 108 utilizes a tolerance parameter to compensate for such differences—as an example, the user authentication module 108 can determine that the action of moving the bow and arrow 304e to the upper left corner is satisfied during log-in if the x, y, z coordinates are within a predetermined distance of the x, y, z coordinates assigned during credential generation. In some embodiments, the user authentication module 108 can adjust the authentication score based upon the tolerance parameter—such as reducing the authentication score when one or more of the actions are outside the associated tolerance parameter.

Another important facet of the technology described herein is the use of user-specific 3D objects that relate to a narrative known only to the user. Instead of using generic 3D objects that are not related to the user, the 3D environment rendering module 106 can be configured to present a plurality of 3D objects at least some of which are associated with a narrative with specific details that the user can remember. For example, a narrative can be associated with an experience undertaken by the user and/or a member of the user's family, such as a recent vacation, concert, sporting event, or the like. In another example, the narrative can be associated with a job, a hobby, a childhood memory, or other types of stories or experiences that are personal to the user.

Figure 6A:
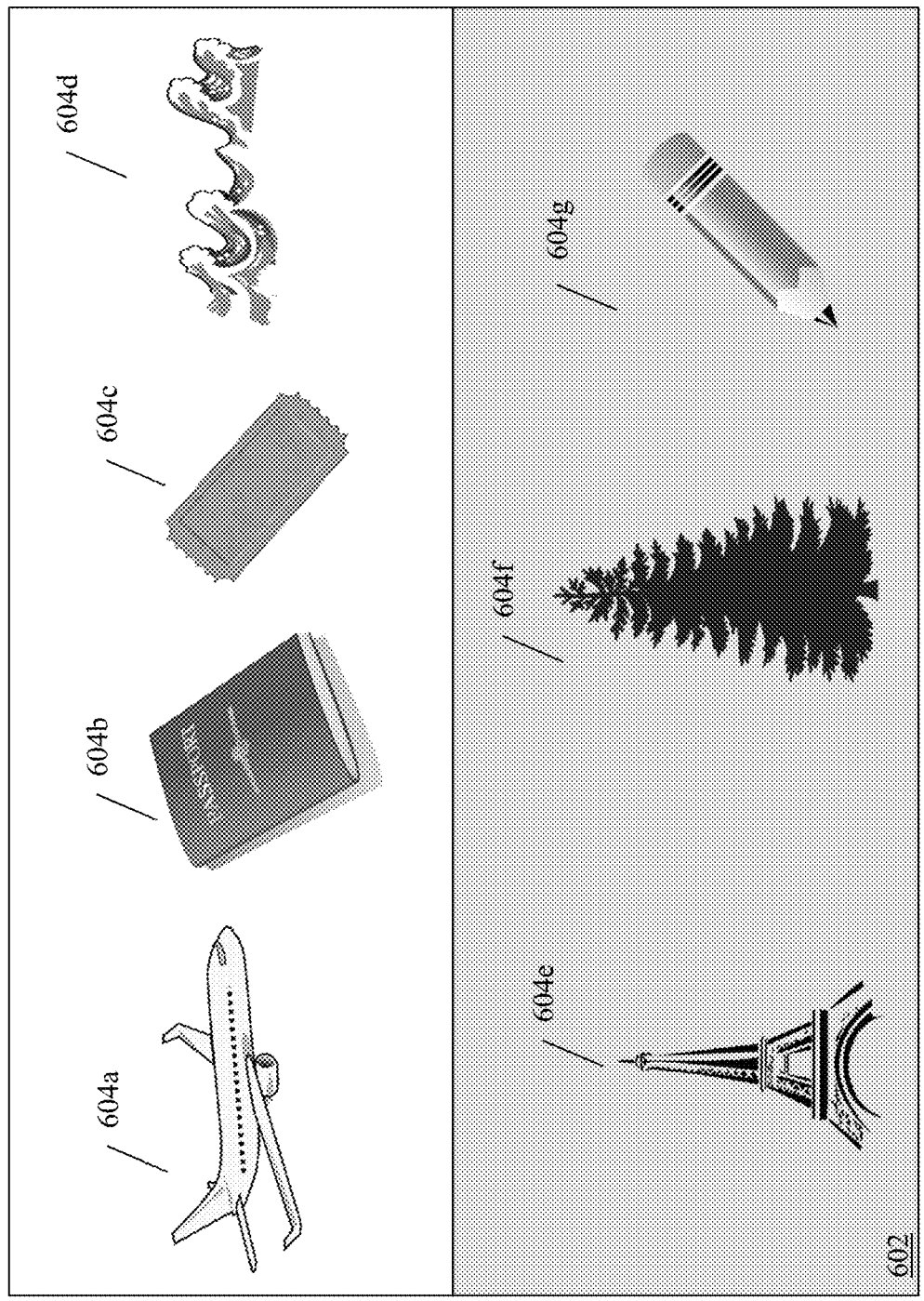
FIGS. 6A-6E comprise a user interface process flow for generating a narrative-based multidimensional user authentication credential in a three-dimensional (3D) alternative reality software application

FIGS. 6A-6F comprise a user interface process flow for generating a narrative-based multidimensional authentication credential in a 3D virtual environment, using the system 100 of FIG. 1. As shown in FIG. 6A, during the authentication credential generation process the user authentication module 108 can retrieve a plurality of 3D objects 602a-602f from database 110 and the 3D environment rendering module 106 can render the objects 602a-602f in the 3D environment (e.g., room 602), at least a portion of which the user had previously assigned as related to the narrative. For example, the user's narrative in this scenario is a recent trip to Paris. The 3D objects presented to the user include an airplane 604a, a passport 604b, a ticket 604c, a body of water 604d, and the Eiffel Tower 604e. Additionally, the computing device 104 can display other 3D objects, like a tree 604f and a pencil 604g, which are not related to the narrative.

Figure 6B:
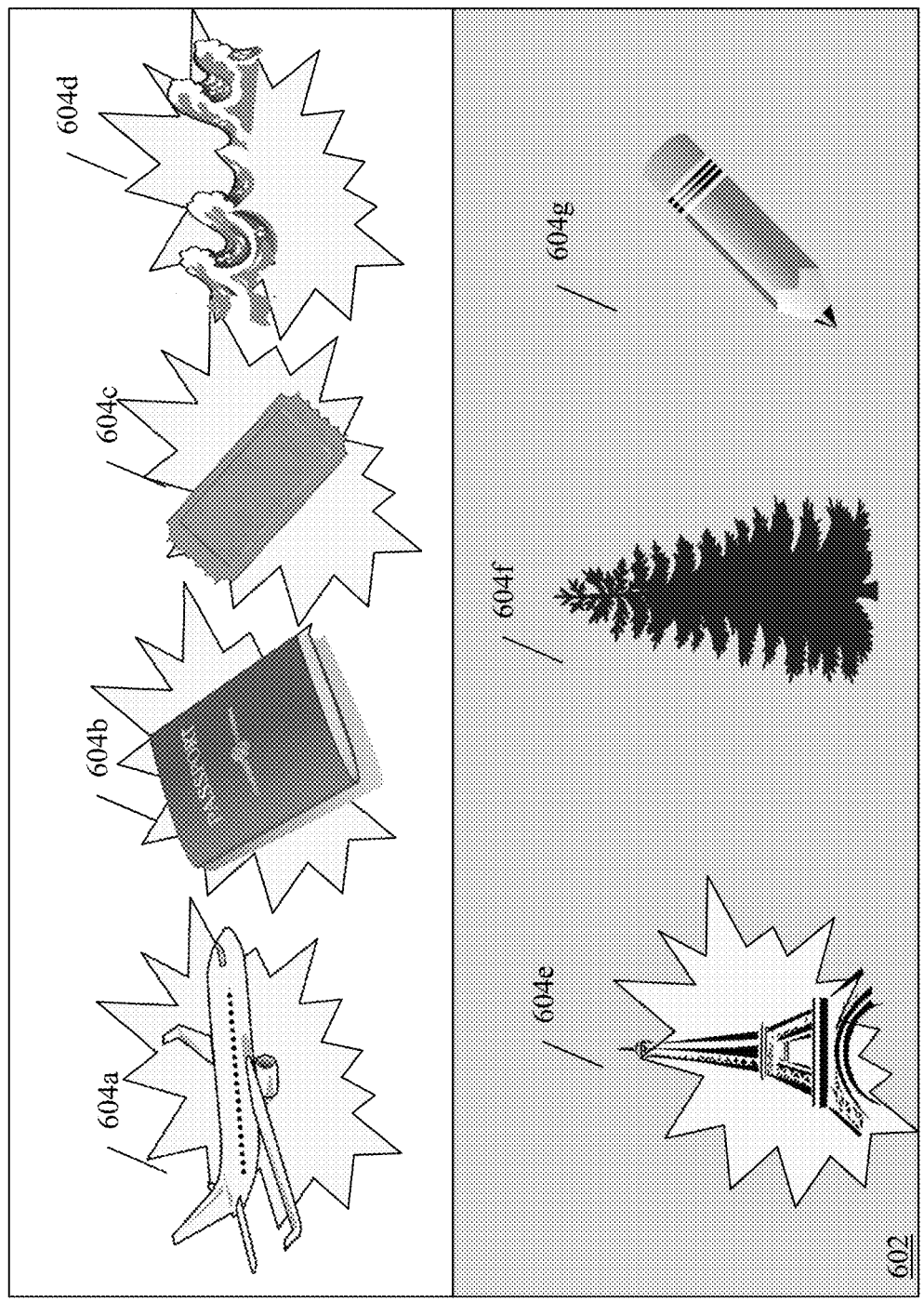
Figure 6C:
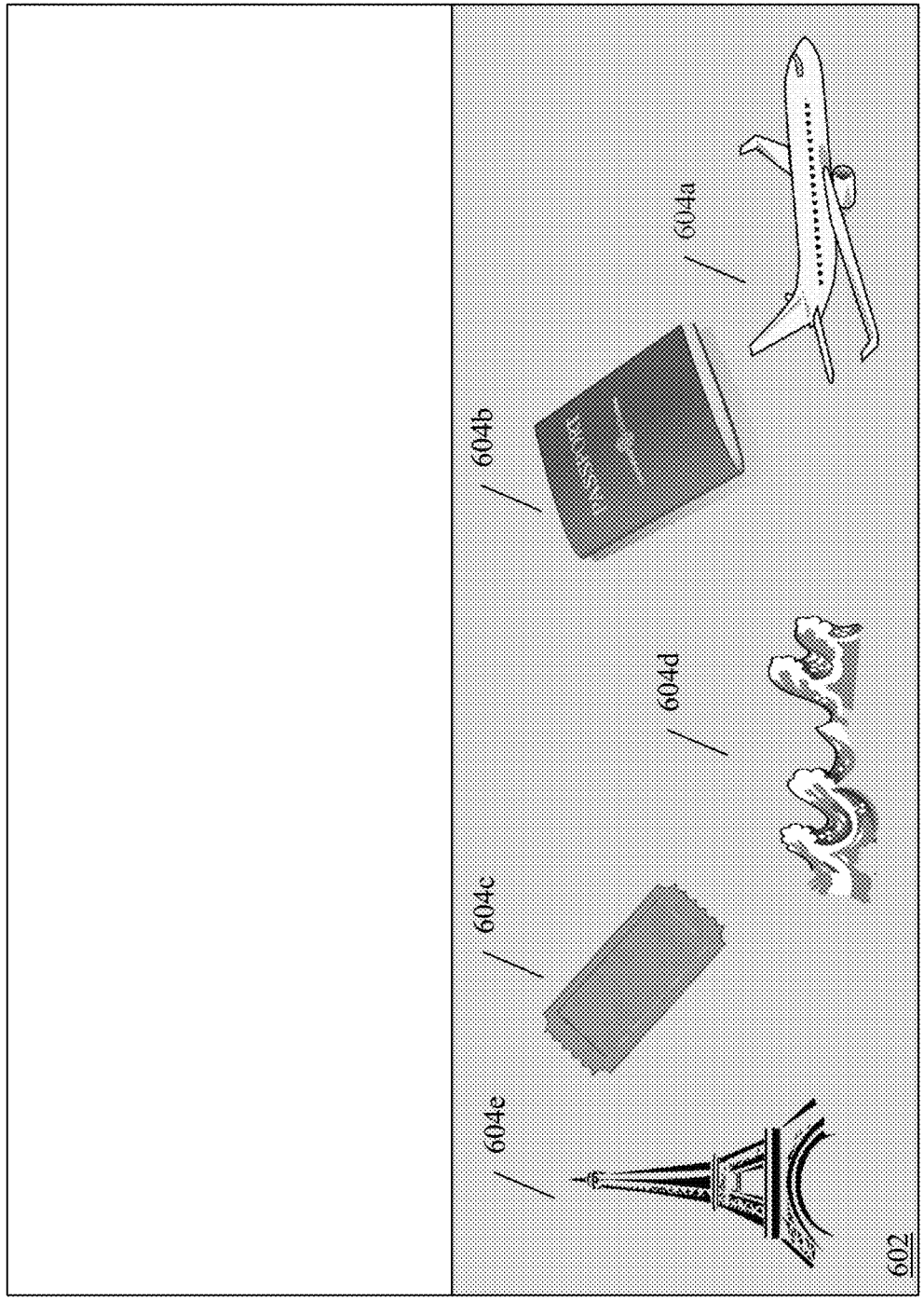

Turning to FIG. 6B, the user selects the 3D objects 604a-604e that relate to the narrative and in FIG. 6C, the 3D environment rendering module 106 has removed the unselected objects and places the selected objects on the floor of the room 602.

Figure 6D:
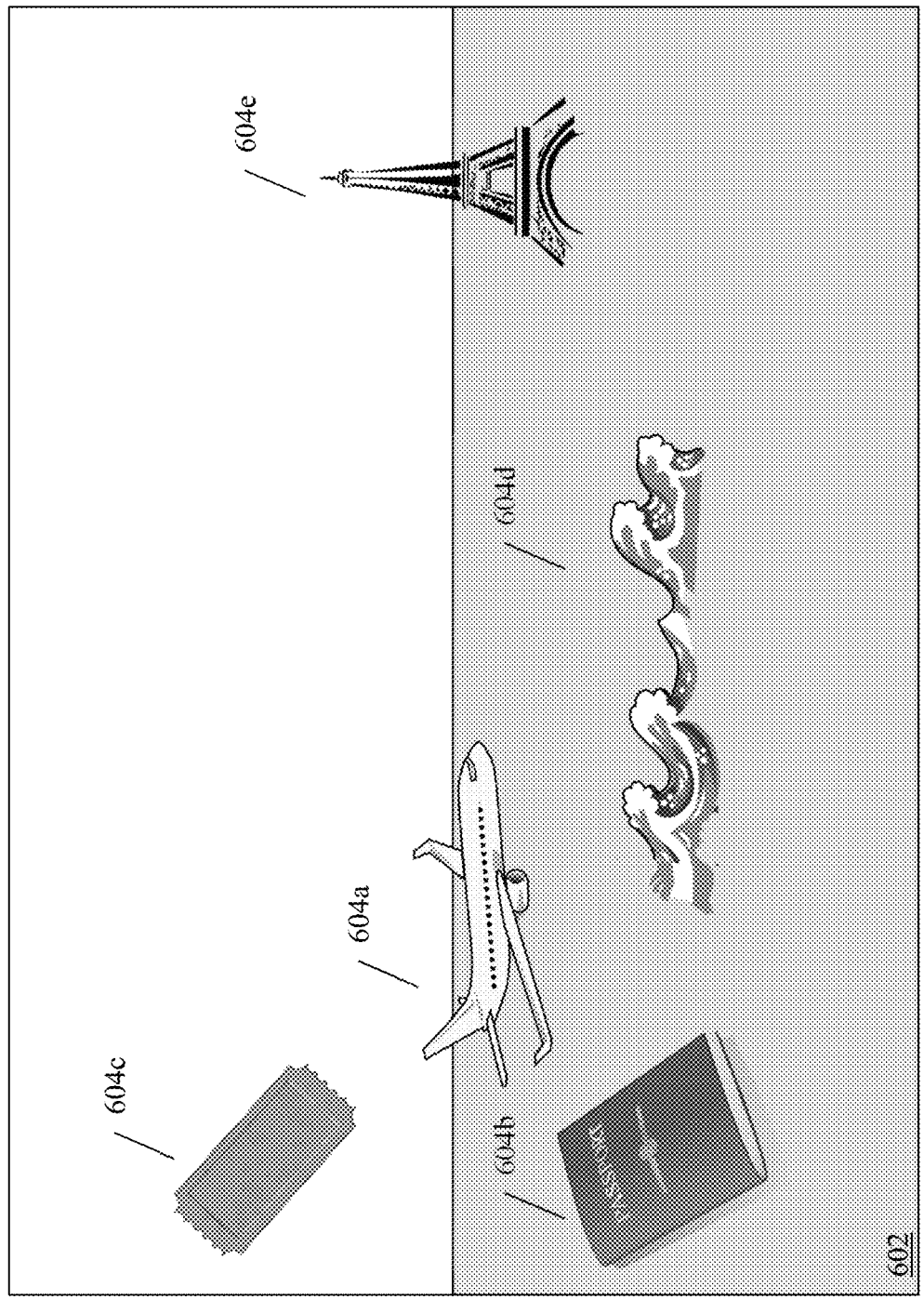
Figure 6E:
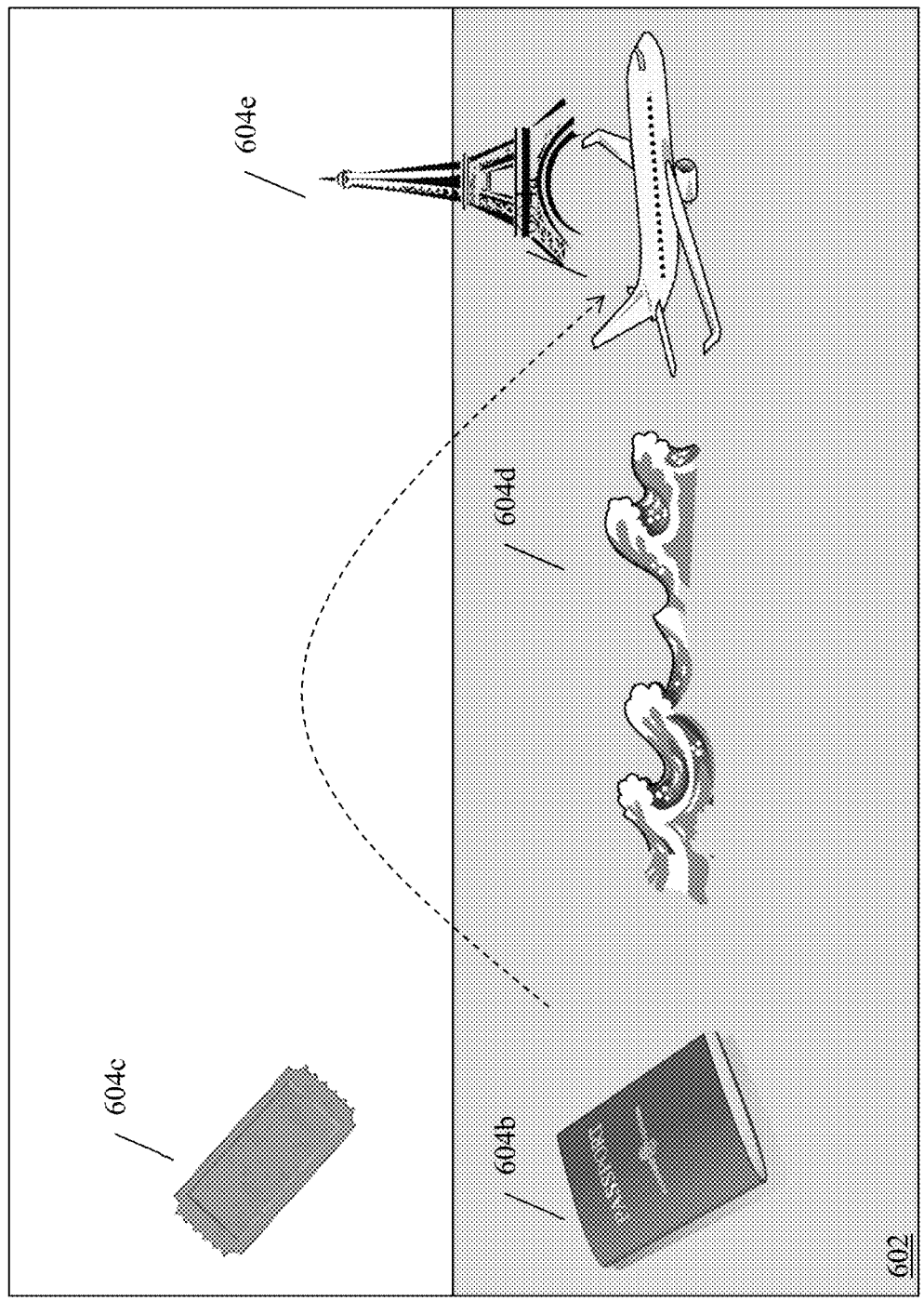

Next, the user begins to perform the first set of actions with respect to the selected objects 604a-604e by, e.g., interacting with the objects in a manner that expresses one or more events relating to the narrative. For example, as shown in FIG. 6D, the user places the passport 604b and the ticket 604c on the left side of the 3D environment—indicating that he or she purchased the ticket and obtained the passport as a first stage in the vacation. Then, the user places the airplane 604a next to the ticket 604c and passport 604b, places the Eiffel Tower 604e on the right side of the 3D environment, and places the ocean 604d in between the airplane and the Eiffel Tower. The user also stretches out the ocean 604d object to make it longer. Then, as shown in FIG. 6E, the user moves the airplane 604a up and over the ocean (indicated by the dashed line)—showing that the user traveled across the Atlantic to get to Paris—thereby completing the credential generation process. Later, when the user is attempting to authenticate to the alternative reality software application using the log-in process described above, the user can remember that his or her vacation to Paris is the narrative and provide the corresponding actions with respect to each of the 3D objects to gain access to the software.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for user authentication in a three-dimensional (3D) alternative reality software application, the system comprising:
    an alternative reality viewing device that displays a 3D virtual environment to a user thereof;
    a computing device coupled to the alternative reality viewing device, the computing device comprising a memory to store computer-executable instructions and a processor that executes the computer-executable instructions to:
        generate the 3D virtual environment for display in the alternative reality viewing device, the 3D virtual environment comprising a plurality of 3D objects;
        identify a subset of the plurality of 3D objects selected by the user of the alternative reality viewing device;
        capture a first set of actions of the user with respect to the subset of 3D objects, including recording a sequence of the first set of actions, the actions comprising one or more of: (i) positioning at least two of the 3D objects in the subset relative to each other, (ii) causing an interaction between at least two of the 3D objects in the subset, (iii) causing an alteration to one or more visual characteristics of at least one 3D object in the subset, (iv) moving at least one 3D object in the subset, (v) holding a gaze of the alternative reality viewing device for an amount of time in relation to at least one 3D object in the subset, or (vi) moving to a different location in the 3D virtual environment with respect to at least one 3D object in the subset,
        wherein, for each action in the first set of actions, the computing device captures a plurality of data points including position and orientation data of the alternative reality viewing device and position information for each 3D object relative to a viewpoint of the user as determined from the position and orientation data;
        generate a multidimensional authentication credential for the user based upon the plurality of data points captured for each action in the first set of actions; and
        store the multidimensional authentication credential in a database.

2. The system of claim 1, wherein the multidimensional authentication credential is based upon the sequence of the first set of actions.

3. The system of claim 1, wherein the multidimensional authentication credential is independent of the sequence of the first set of actions.

4. The system of claim 1, wherein the computing device receives a request to authenticate the user, the request including a second set of actions of the user with respect to the subset of 3D objects, wherein each action in the second set of actions comprises a plurality of data points including position and orientation data of the alternative reality viewing device and position information for each 3D object relative to a viewpoint of the user as determined from the position and orientation data.

5. The system of claim 4, wherein the computing device converts the plurality of data points captured for each action in the second set of actions into a candidate multidimensional authentication credential, compares the candidate multidimensional authentication credential to the multidimensional authentication credential, and generates an authentication score based upon the comparison.

6. The system of claim 5, wherein the computing device rejects the request to authenticate the user when the authentication score is below a predetermined threshold value.

7. The system of claim 5, wherein the computing device approves the request to authenticate the user when the authentication score is at or above a predetermined threshold value.

8. The system of claim 1, wherein the computing device applies one or more real-world physics rules to at least one of the 3D objects in the subset during capture of the first set of actions.

9. The system of claim 8, wherein the multidimensional authentication credential comprises the one or more real-world physics rules applied by the computing device during capture of the first set of actions.

10. The system of claim 8, wherein the computing device applies the one or more real-world physics rules to at least one of the 3D objects during capture of a second set of actions of the user as part of an authentication request.

11. The system of claim 1, wherein positioning at least two of the 3D objects in the subset relative to each other comprises placing one of the at least two 3D objects in relation to a light source in the 3D virtual environment such that a shadow of the placed 3D object is positioned relative to the other 3D objects.

12. The system of claim 1, wherein the first set of actions further comprises removing at least one of the 3D objects in the subset from the 3D virtual environment.

13. The system of claim 1, wherein causing an alteration to one or more visual characteristics of at least one 3D object in the subset comprises distorting an appearance of the at least one 3D object in the 3D virtual environment.

14. The system of claim 1, wherein for each action in the first set of actions, the computing device captures the plurality of data points at each of a time immediately prior to the user performing the action, a time during which the user performs the action, and a time immediately after the user performs the action.

15. A computerized method of user authentication in a three-dimensional (3D) alternative reality application, the method comprising:
    generating, by a computing device, a 3D virtual environment for display in an alternative reality viewing device coupled to the computing device, the 3D virtual environment comprising a plurality of 3D objects;

identifying, by the computing device, a subset of the plurality of 3D objects selected by the user of the alternative reality viewing device;

capturing, by the computing device, a first set of actions of the user with respect to the subset of 3D objects, including recording a sequence of the first set of actions, the actions comprising one or more of: (i) positioning at least two of the 3D objects in the subset relative to each other, (ii) causing an interaction between at least two of the 3D objects in the subset, (iii) causing an alteration to one or more visual characteristics of at least one 3D object in the subset, (iv) moving at least one 3D object in the subset, (v) holding a gaze of the alternative reality viewing device for an amount of time in relation to at least one 3D object in the subset, or (vi) moving to a different location in the 3D virtual environment with respect to at least one 3D object in the subset, wherein, for each action in the first set of actions, the computing device captures a plurality of data points including position and orientation data of the alternative reality viewing device and position information for each 3D object relative to a viewpoint of the user as determined from the position and orientation data;

generating, by the computing device, a multidimensional authentication credential for the user based upon the plurality of data points captured for each action in the first set of actions; and storing, by the computing device, the multidimensional authentication credential in a database.

16. The method of claim 15, wherein the multidimensional authentication credential is based upon the sequence of the first set of actions.

17. The method of claim 15, wherein the multidimensional authentication credential is independent of the sequence of the first set of actions.

18. The method of claim 15, wherein the computing device receives a request to authenticate the user, the request including a second set of actions of the user with respect to the subset of 3D objects, wherein each action in the second set of actions comprises a plurality of data points including position and orientation data of the alternative reality viewing device and position information for each 3D object relative to a viewpoint of the user as determined from the position and orientation data.

19. The method of claim 18, wherein the computing device converts the plurality of data points captured for each action in the second set of actions into a candidate multidimensional authentication credential, compares the candidate multidimensional authentication credential to the multidimensional authentication credential, and generates an authentication score based upon the comparison.

20. The method of claim 19, wherein the computing device rejects the request to authenticate the user when the authentication score is below a predetermined threshold value.

21. The method of claim 19, wherein the computing device approves the request to authenticate the user when the authentication score is at or above a predetermined threshold value.

22. The method of claim 15, wherein the computing device applies one or more real-world physics rules to at least one of the 3D objects in the subset during capture of the first set of actions.

23. The method of claim 22, wherein the multidimensional authentication credential comprises the one or more real-world physics rules applied by the computing device during capture of the first set of actions.

24. The method of claim 22, wherein the computing device applies the one or more real-world physics rules to at least one of the 3D objects during capture of a second set of actions of the user as part of an authentication request.

25. The method of claim 15, wherein positioning at least two of the 3D objects in the subset relative to each other comprises placing one of the at least two 3D objects in relation to a light source in the 3D virtual environment such that a shadow of the placed 3D object is positioned relative to the other 3D objects.

26. The method of claim 15, wherein the first set of actions further comprises removing at least one of the 3D objects in the subset from the 3D virtual environment.

27. The method of claim 15, wherein causing an alteration to one or more visual characteristics of at least one 3D object in the subset comprises distorting an appearance of the at least one 3D object in the 3D virtual environment.

28. The method of claim 15, wherein for each action in the first set of actions, the computing device captures the plurality of data points at each of a time immediately prior to the user performing the action, a time during which the user performs the action, and a time immediately after the user performs the action.

* * * * *